Feb. 17, 1942.  P. O. PFEIFFER  2,273,283
METHOD OF MAKING VEHICLE TIRES
Filed Aug. 29, 1940  3 Sheets-Sheet 1

INVENTOR
Paul O. Pfeiffer
BY
Evans & McCoy
ATTORNEYS

Feb. 17, 1942.    P. O. PFEIFFER    2,273,283
METHOD OF MAKING VEHICLE TIRES
Filed Aug. 29, 1940    3 Sheets-Sheet 2
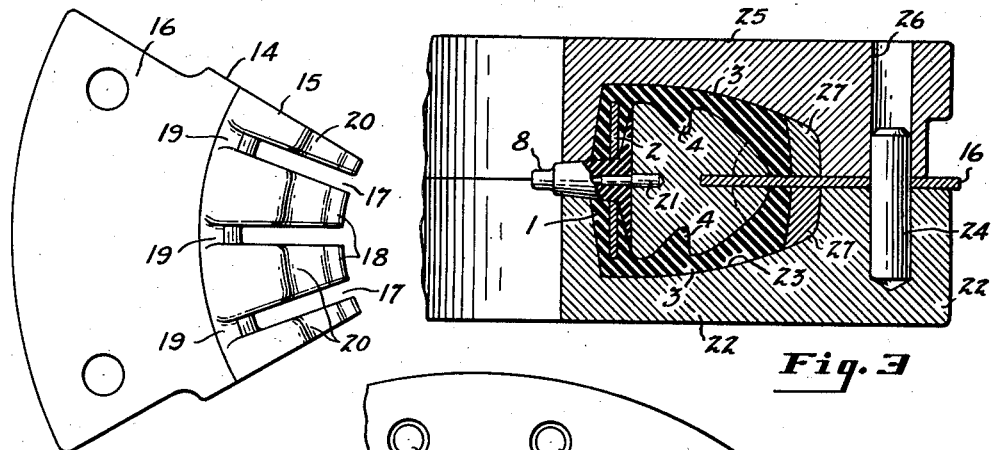
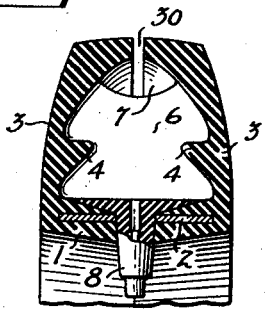
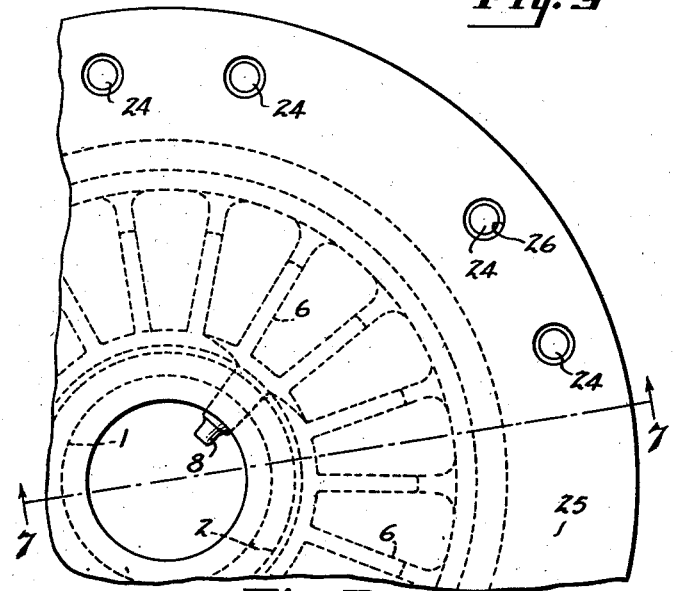
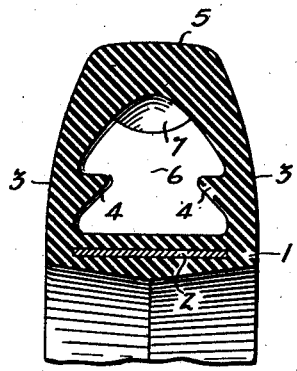
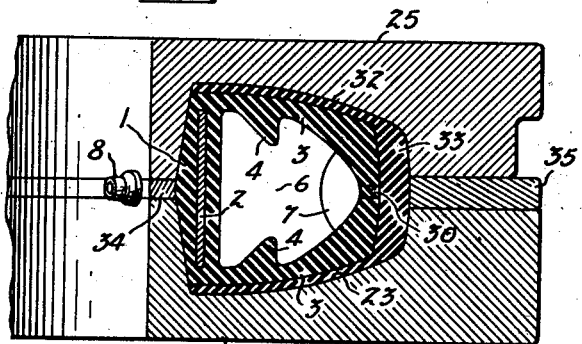
INVENTOR
Paul O. Pfeiffer
BY
Evans + McCoy
ATTORNEYS Feb. 17, 1942. P. O. PFEIFFER 2,273,283
METHOD OF MAKING VEHICLE TIRES
Filed Aug. 29, 1940 3 Sheets-Sheet 3

INVENTOR
Paul O. Pfeiffer
BY
Evans + McCoy
ATTORNEYS

Patented Feb. 17, 1942

2,273,283

UNITED STATES PATENT OFFICE 2,273,283

METHOD OF MAKING VEHICLE TIRES

Paul O. Pfeiffer, Akron, Ohio, assignor to The General Tire & Rubber Company, Akron, Ohio, a corporation of Ohio Application August 29, 1940, Serial No. 354,640

4 Claims. (Cl. 154—12)

This invention relates to vehicle tires, and more particularly to a tire capable of operation either as a pneumatic tire or as a cushion tire. Pneumatic tires used on wheels of airplanes or motor vehicles in military service are subject to the danger of puncture by bullets. The puncture of an airplane landing wheel tire is apt to cause damage to the plane in landing and the puncture of a ground vehicle tire puts the vehicle out of commission. The use of solid rubber or cushion tires is objectionable in planes because of the increased weight and inferior cushioning ability of the tire. The use of cushion tires on motor vehicles is objectionable because of the interior cushioning ability of the tire, the greater difficulty in steering, and because of the fact that cushion tires are much less durable than pneumatic tires.

The present invention has for its object to provide a pneumatic tire which is so constructed that it is capable of sustaining the loads to which it may be subjected without the aid of internal air pressure, and which is capable of operating satisfactorily after its air has been released by puncture.

With the above and other objects in view the invention may be said to comprise a tire and the method of making the same as illustrated in the accompanying drawings hereinafter described and particularly set forth in the appended claims, together with such variations and modifications thereof as will be apparent to one skilled in the art to which the invention appertains. Reference should be had to the accompanying drawings forming a part of the specification, in which:

Fig. 3 is a radial section taken on the line indicated at 3—3 in Fig. 1;

Fig. 4 is a side elevation of one of the core sections;

Fig. 5 is a transverse section through a partially vulcanized tire body after the core is removed;

Fig. 6 is a fragmentary plan view showing the mold with the tire therein ready for the final vulcanizing operation;

Fig. 7 is a section taken on the line indicated at 7—7 in Fig. 6;

Fig. 8 is a transverse section through a completed tire;

Figure 1:
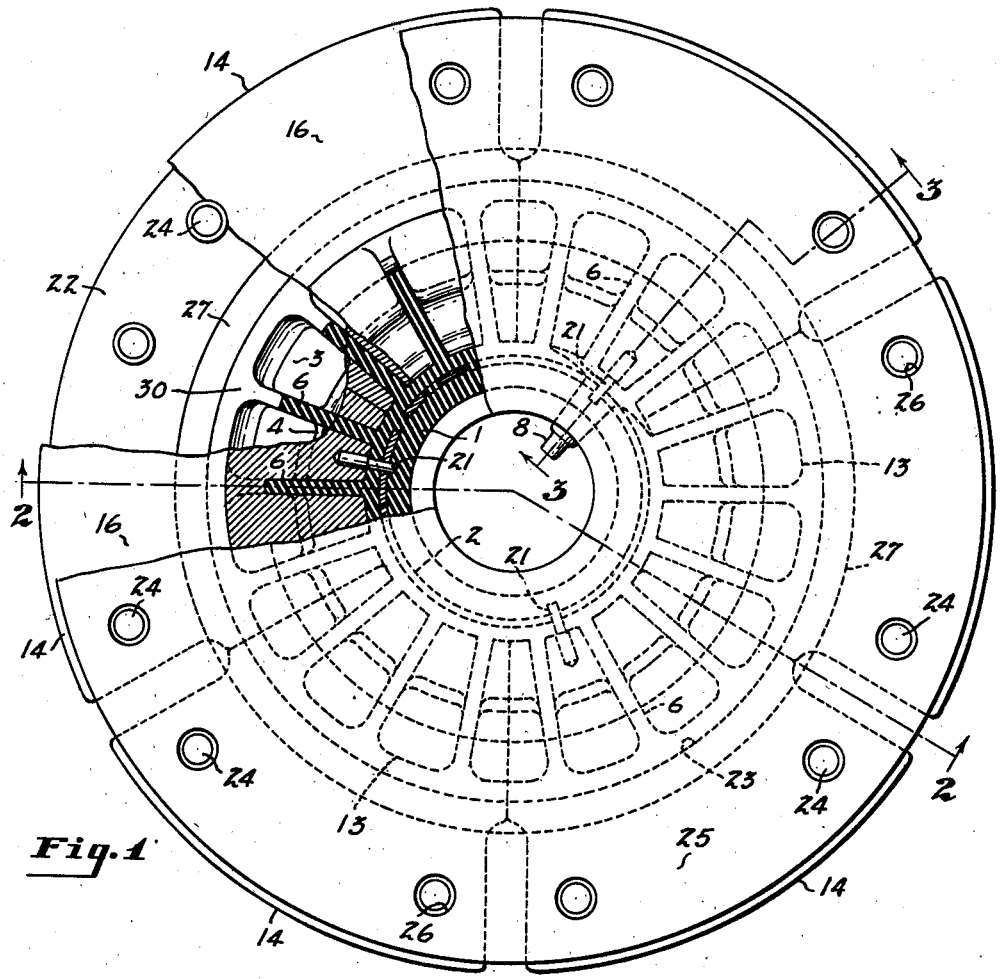
Figure 1 is a plan view of the tire vulcanizing mold used in making the tire of the present invention, a portion of the mold being broken away to show the core structure.
Figure 2:
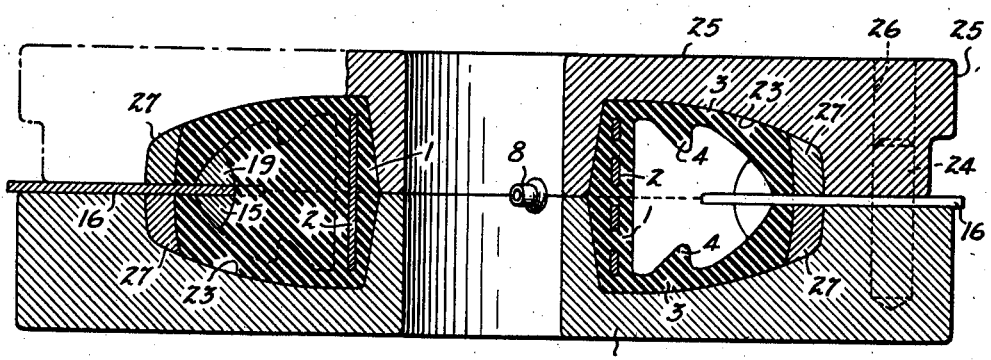
Fig. 2 is a transverse section taken on the line indicated at 2—2 in Fig. 1.

A tire embodying the invention is shown in Fig. 8 of the drawings. This tire is a circumferential continuous one-piece rubber tire having a tire base 1 reinforced with a cylindrical metal band 2, side walls 3 stiffened by internal circumferential ribs 4 and a thickened tread 5. A series of closely spaced transverse webs 6 are provided within the tire cavity. These webs are integral with the base and side walls of the tire and extend from the base of the tire to adjacent the tread thereof. The upper edges of the webs 6 are spaced from the tread of the tires to provide apertures 7, so that all of the chambers between the webs 6 are in communication for equalization of air pressure within the tire. The tire is provided with a valve stem 8 through which air under pressure may be introduced to the interior of the tire. The webs 6, which are composed of elastic rubber, support load under tension when weight is imposed upon the tire. The weight imposed upon the tire tends to bulge the side walls of the tire, increasing the width of the cavity and stretching the transverse webs 6. The tire is designed to operate normally with a low inflation pressure, the load being sustained partially by the body of compressed air within the tire cavity and partially by the tension webs 6. When the air within the tire is released by puncture, the load is supported mainly by the transverse tension webs, which are capable of giving service for a considerable period of time after puncture of the tire.

Figures 9, 10:
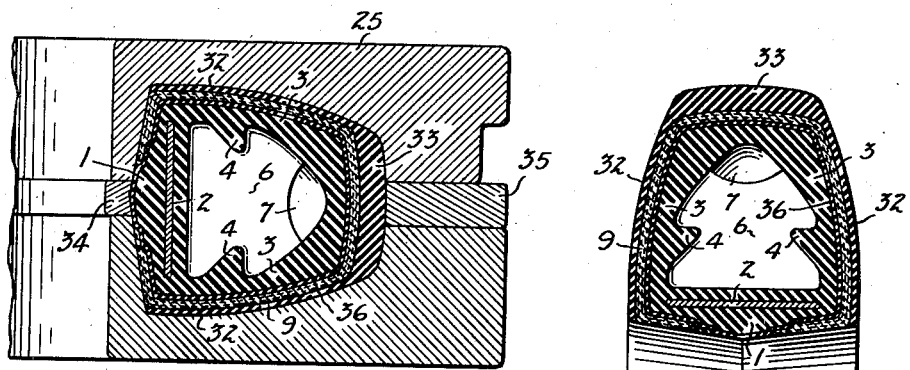
Fig. 9 is a transverse section through the mold showing a tire therein provided with cord fabric reinforcement.
Fig. 10 is a transverse section through the completed fabric reinforced tire.

The tire of the present invention may be reinforced with cord fabric, as shown in Fig. 10 of the drawings, the tire shown in Fig. 10 being the same in structure as that shown in Fig. 8 except that the tire walls are reinforced with a plurality of plies 9 of cord fabric. The plies of cord fabric have their opposite edges attached to the underside of the tire base and extend from one side of the tire base to the other through the side walls and tread portion of the tire.

Figure 11:
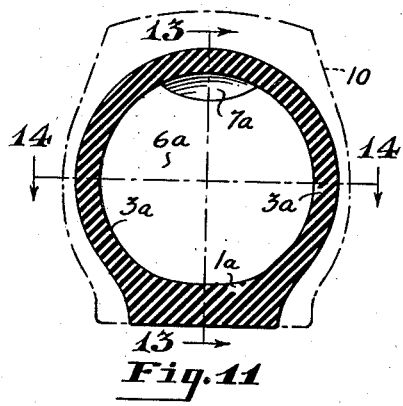
Fig. 11 is a sectional view showing an inner tube embodying the invention.
Figure 13:
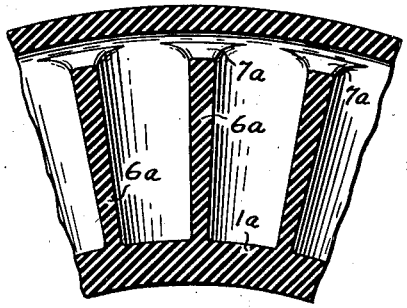
Fig. 13 is a section taken on the line indicated at 13—13 in Fig. 11.
Figure 14:
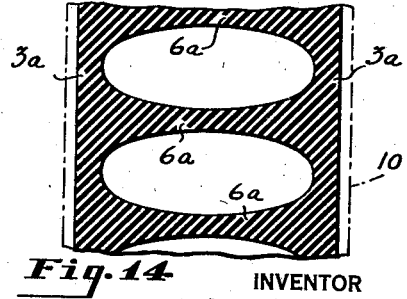
Fig. 14 is a section taken on the line indicated at 14—14 in Fig. 11.

The tire of the present invention may also be used as an inner tube for a conventional pneumatic tire casing, as shown in Fig. 11 of the drawings. In this instance a tire or tube embodying the invention is molded and vulcanized to an external form to fit within a conventional tire casing 10, the tire or tube having a base portion 1a adapted to fit between the beads of the tire casing 10 and engage the rim upon which the tire is mounted. The tube also has flexible side walls 3a and flexible transverse webs 6a. When the tire or tube of the present invention is employed as an inner tube for a tire casing, the metal reinforcing band 2 may be omitted and also the internal reinforcing ribs 4. The transverse webs 6a, however, serve the same purpose as in the forms previously described, the upper edges of the webs 6a being spaced from the tread portion to provide apertures 7a for equalization of air pressure. The webs 6a are preferably formed so that they have gradually increasing thickness from their inner to their outer edges, as shown in Fig. 13 of the drawings, and these webs also are preferably formed of gradually decreasing thickness from their side edges to the center plane of the tire, as shown in Fig. 14. The thickening of the side edge portions of the webs serves to stiffen the side walls and the tapering of the webs from their outer edges to the tire base provides greater resistance to elongation in the portions of the webs adjacent the tread, so that the load is more advantageously distributed throughout the webs.

Referring to Figs. 1 to 4 of the drawings, the tire body is molded upon a sectional annular core 13 composed of arcuate sections 14 which are joined together end to end to form the annular core. The segments are of identical construction and each has a relatively thick inner portion 15 and a centrally disposed outer web 16. The thickened inner portion of each section is provided with radial transverse slots 17 which extend outwardly from the inner edge of the core to near the outer edge of the thickened portion 15, the slots 17 providing spaced radially disposed projections 18 which form the cavities between the webs 6 of the tire. The outer edge portion 19 of the thickened portion of the core is continuous and the continuous portion 19 forms the apertures 7 between the outer edges of the webs 6 and the tread portion of the tire. The radial projections 18 are provided with grooves 20 in opposite sides thereof which form the circumferential internal ribs 4 on the side walls of the tire. Positioning pins 21 are mounted in the tips of certain of the radial projections 18 and one of these pins is adapted to project into and close the aperture of the valve stem 8, and the other pins are adapted to engage in apertures in the metal band 2.

The tire is built up upon the core and molded in a tire vulcanizing mold having a lower mold section 22 which has an annular tire receiving cavity 23 in its upper face. The mold section 22 has positioning pins 24 for positioning an upper section 25 which has apertures 26 to receive the pins 24, the upper section of the mold being provided with a cavity to receive the upper half of a tire.

In building the tire a tread filler ring 27 is placed in the lower mold section and a suitable layer of uncured rubber is placed within the cavity 23 of the lower section. The core ring is then assembled with the band 2 held in place by the pins 21 and with a valve stem 8 mounted in the band 2. Uncured rubber is then placed in the radial slots 17 of the core and over the exterior of the core and band 2, after which the upper mold section with a tread filler ring 27 therein is placed upon the lower mold section, as shown in Fig. 3. The rubber is pressed about the core and between the mold sections 22 and 25 and molded within the mold cavity. The tire body is then partially vulcanized after which the tire and core are removed from the mold and the sectional core is removed through the tread of the molded tire body, leaving a partially vulcanized tire body such as shown in Fig. 5 of the drawings. This tire body has a continuous circumferential slot 30 in its tread portion through which the core has been withdrawn, and this slot is sealed with a strip of unvulcanized rubber 31, after which a rubber covering 32 is applied to the side walls and tread portion of the tire body, the tread portion 33 of the covering being thickened to provide a suitable tire tread. After the application of the covering of uncured rubber to the partialy vulcanized body of the tire, the tire is replaced within the same mold, the cavity of the mold being accommodated to the tire by removing the filler rings 27 and by providing inner and outer spacing rings 34 and 35, the ring 34 having an external diameter corresponding to the internal diameter of the tire cavity, and the outer ring 35 having an internal diameter corresponding to the external diameter of the tire cavity.

After the tire has been replaced in the mold, it is vulcanized under heat and pressure. Steam may be introduced into the interior of the tire if desired, as is common practice in the vulcanization of pneumatic tires and tubes.

If it is desired to provide fabric reinforcement for the tire, this may be done by applying the plies 9 of cord tire fabric to the partially vulcanized tire body shown in Fig. 5 before applying the rubber covering 32. The plies 9 extend through the side walls and the tread portion of the tire. The fabric plies may be stitched upon the partially vulcanized tire body by conventional methods, the layers of fabric being of a width to extend entirely over the side walls and tread portion of the tire body with opposite edge portions folded under the base thereof at opposite sides of the tire. To insure better adhesion between the fabric and rubber, a thin layer 36 of unvulcanized rubber is preferably interposed between the inner ply of fabric and the partially vulcanized tire body.

Figure 12:
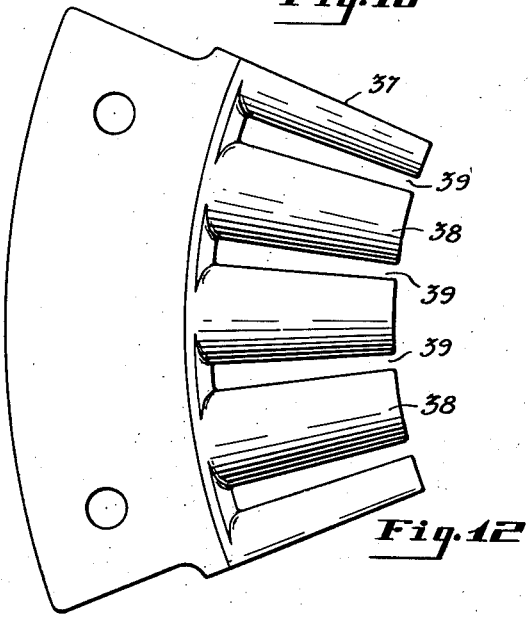
Fig. 12 is a side elevation of a section of the core used in making the inner tube.

In making an inner tube such as shown in Fig. 11, a core built up of segments 37, such as shown in Fig. 12 of the drawings, is employed. This core is similar to the core shown in Fig. 4 except that the radial cavity forming projections 38 are substantially oval in cross section and are formed with a taper such that the slots 39 intermediate the projections gradually decrease in width from their outer ends to their inner ends, the projections 38 forming the webs 6a with oval cavities between the webs.

It is to be understood and variations and modifications of the specific devices herein shown and described for purposes of illustration, may be made without departing from the spirit of the invention.

What I claim is:

1. The herein described method of making a hollow rubber tire which comprises assembling a series of arcuate metal core sections to form an annular core, the core sections having relatively thick cavity forming inner portions which abut end to end and exterior centrally disposed webs, covering the cavity forming portion of the core with uncured rubber, molding and partially vulcanizing the rubber to form a tire body on said core, removing the core sections through the tread portion of the tire body, applying a continuous band of uncured tread rubber to the tread portion of the tire body, and vulcanizing said tire body and tread band under heat and pressure.

2. The herein described method of making a hollow rubber tire which comprises assembling a series of arcuate metal core sections to form an annular core, the core sections having relatively thick cavity forming inner portions which abut end to end and exterior centrally disposed webs covering the cavity forming portion of the core with uncured rubber, molding and partially vulcanizing the rubber to form a tire body on said core, removing the core sections through the tread portion of the tire body, applying a continuous band of uncured tread rubber to the tread portion of the tire body, placing the tire body with the tread band thereon in a vulcanizing mold, supplying fluid under pressure to the tire cavity to expand the tire in the mold, and applying heat to the tire to vulcanize the rubber.

3. The herein described method of making a hollow rubber tire which comprises assembling a series of arcuate metal core sections to form an annular core, the core sections having relatively thick cavity forming inner portions which abut end to end and exterior centrally disposed webs, each core section having transverse slots extending radially outwardly from its inner edge to near the outer edge of the thickened portion, filling said slots and covering the cavity forming portion of the core with uncured rubber, molding and partially vulcanizing the rubber to form a tire body on said core, removing the core sections through the tread portion of the tire body, applying a continuous band of uncured tread rubber to the tread portion of the tire body, and vulcanizing said tire body and tread band under heat and pressure.

4. The herein described method of making a hollow rubber tire which comprises assembling a series of arcuate metal core sections to form an annular core, the core sections having relatively thick cavity forming inner portions which abut end to end and exterior centrally disposed webs, each core section having transverse slots extending radially outwardly from its inner edge to near the outer edge of the thickened portion, filling said slots and covering the cavity forming portion of the core with uncured rubber, molding and partially vulcanizing the rubber to form a tire body on said core, removing the core sections through the tread portion of the tire body, applying layers of cord fabric to the surface of the partially vulcanized body, applying a covering of rubber outside the fabric, and vulcanizing the tire under heat and pressure.

PAUL O. PFEIFFER.